Dec. 29, 1964
D. A. HUELSKAMP
3,162,900
EXTRUDER LIFTING AND ROTATING DEVICE
Filed June 20, 1962
2 Sheets-Sheet 1
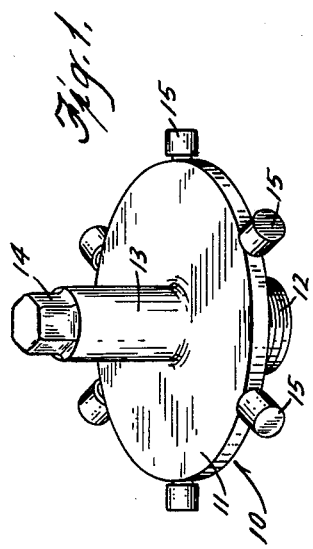
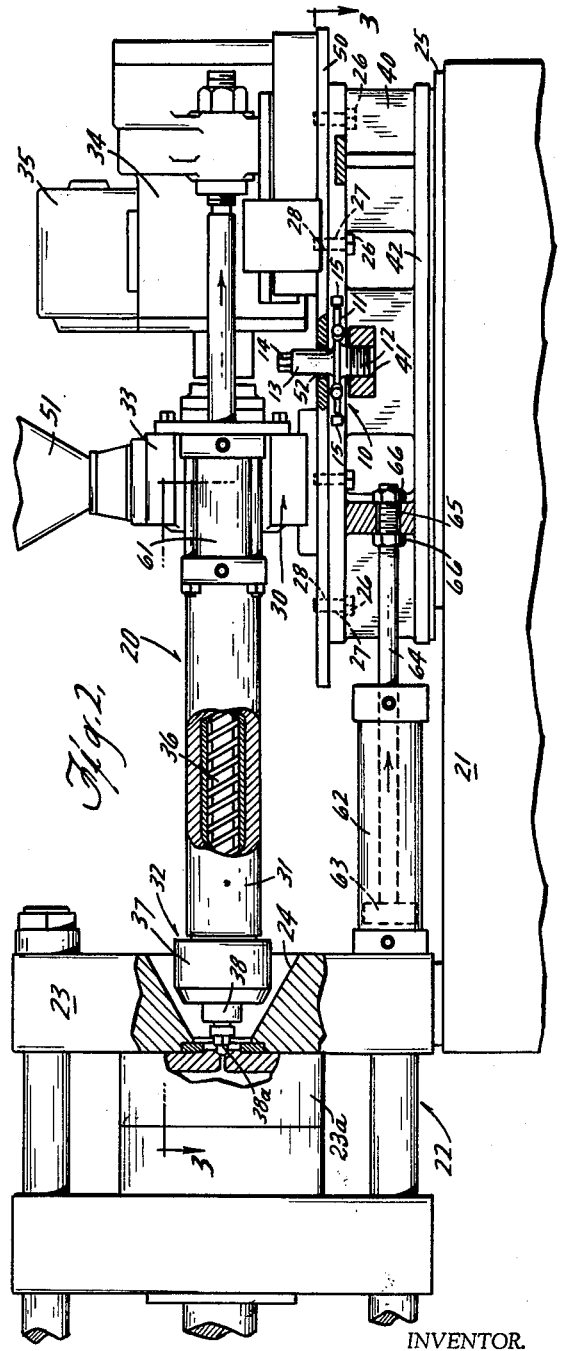
INVENTOR.
DONALD A. HUELSKAMP
BY
ATTORNEY.

Dec. 29, 1964   D. A. HUELSKAMP   3,162,900
EXTRUDER LIFTING AND ROTATING DEVICE
Filed June 20, 1962   2 Sheets-Sheet 2
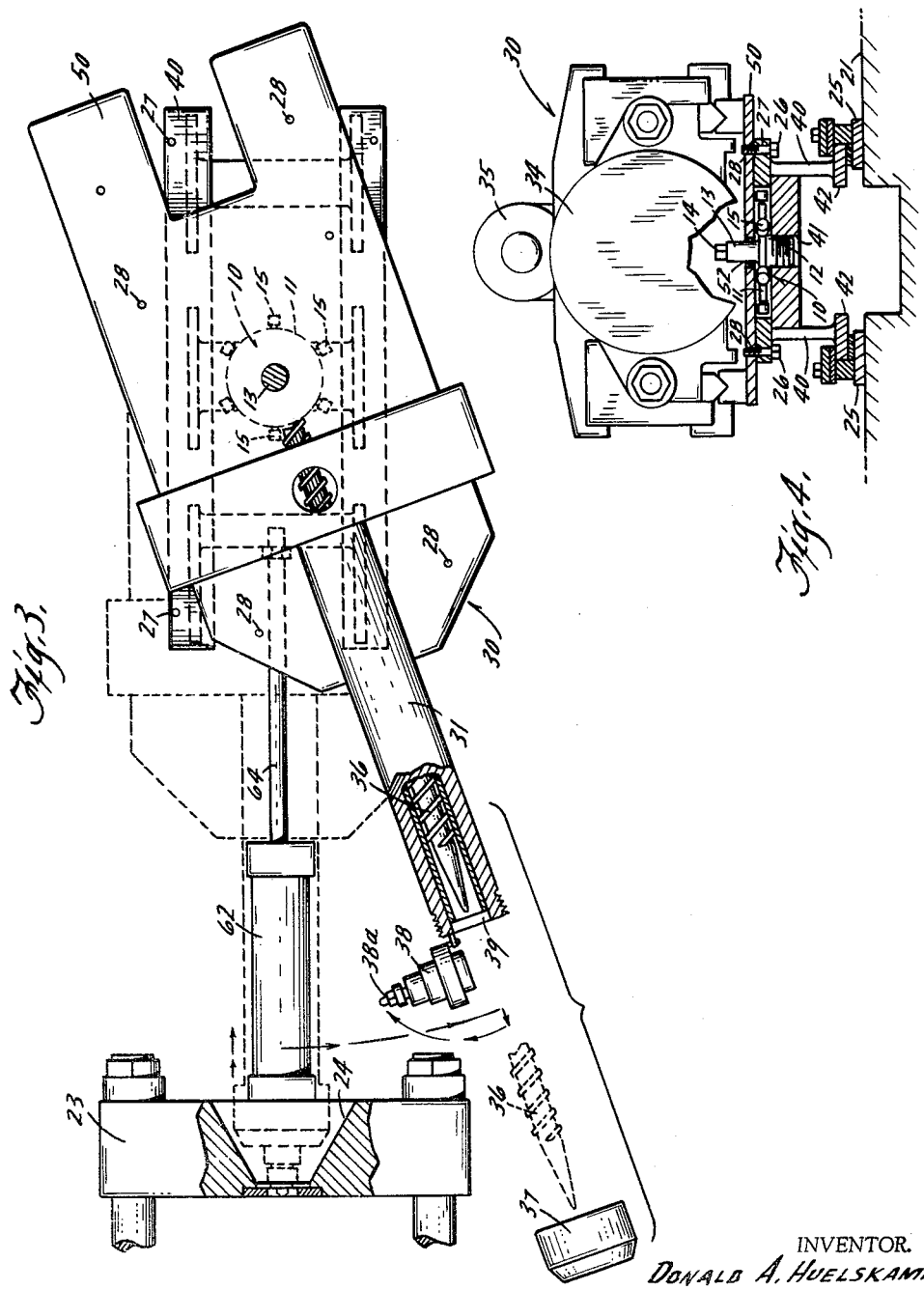
INVENTOR.
DONALD A. HUELSKAMP
BY John F. Friell
ATTORNEY.

United States Patent Office 3,162,900
Patented Dec. 29, 1964

3,162,900
EXTRUDER LIFTING AND ROTATING DEVICE
Donald A. Huelskamp, Mount Gilead, Ohio, assignor to Koehring Company, Milwaukee, Wis., a corporation of Wisconsin
Filed June 20, 1962, Ser. No. 203,961
7 Claims. (Cl. 18—30)

The present invention relates generally to machines such as injection molding machines, and more particularly to mountings therefor which are adapted to simplify the serviceability of the machine.

Machines of the type for which the invention has utility include screw-type injection molding machines. Briefly stated, machines of this type plasticize the material to be molded, and inject the same into an appropriate die under pressure. In the screw-type machine, the molding material is plasticized by mechanical working through the use of a relatively long screw which rotates in a barrel, moving the material towards the injection end of the barrel as it becomes plasticized. The material is then forced through a relatively small nozzle which is pressed against a die. It will be appreciated that the nature of the material being worked requires that a certain amount of service and maintenance be conducted on the nozzle assembly, extruder barrel, and screw. For example, when the color of the material is changed, it is sometimes desirable to clean away any residuary material of the previously used color by removing the nozzle and screw. Also, the nozzle assembly or screw may become clogged from time to time necessitating its removal and maintenance. It is not uncommon to have to replace the screw or screw tip from time to time in the normal maintenance and servicing of the machine.

Machines of this type are often massive in construction in order to provide a long working life under the relatively high pressures which they encounter. In order to operate machines of this type efficiently, it is necessary that the service and maintenance time and shut-down time incident thereto be minimized so that the productive operation of the machine may be kept high. By its very construction, however, servicing and maintenance difficulties pose a considerable problem in the operation of these machines. As previously noted, one of the more frequent areas of servicing and maintenance is the extruder portion which involves the nozzle assembly, barrel, and screw which are relatively inaccessible, due to the machine construction. Attempts have been made from time to time to alter the construction of the machine so as to provide ready access to these parts. One solution which might appear is to provide a bed upon which the machine may be retracted from the die block assembly a sufficient distance to allow removal of the screw through the front end of the barrel in the nozzle assembly. Because of the large mass of the machine and the length of the screw, which is commonly quite long, this solution is impractical and often simply not available, both from the added space to be required to allow the extruder to be moved back, and from the added expense which would be required to construct a bed capable of supporting the same. Other solutions include attempts at modifying the barrel construction to provide access thereto from the rear, but because the complex bearing normally required to absorb the heavy loads on the screw, as well as the various hydraulic motors which contribute to the operation thereof are commonly and most conveniently located in this area, this solution has not proved satisfactory.

It is, therefore, an object of the present invention to provide a suitable mounting for an injection molding machine of the type described, which will solve the maintenance and servicing problems of the machine in a practical manner.

Accordingly, it is an object of the present invention to provide an extruder mounting which will permit the positioning of the extruder for convenient servicing and maintenance of the barrel, and removal and replacement of the screw without extending the extruder base or otherwise rearranging other elements of the device, such as the bearings and transmission in the rear, or the die block in the front.

It is another object of the present invention to provide an improved mounting for an extruder which will permit the extruder to be positioned for servicing with minimum modification of presently existing designs of the device. It is a related object to provide a mounting for an extruder which is adaptable to machines already in use as well as those under construction with a minimum of expense and effort, and it is still another object of the present invention to provide an improved mounting for an extruder which is efficient enough to permit the manual repositioning of the exruder for servicing and maintenance thereof, although powered repositioning is also contemplated.

These and other objects and advantages will become more apparent upon the reading of the following detailed description of the invention in conjunction with the appended drawings, wherein:

FIGURE 1 is a perspective view of an exemplary mounting device embodying the principles of the present invention;

FIGURE 2 is a side elevation view, partially in section, of an exemplary extruder embodying the principles of the present invention, portions of the mechanism are broken away to provide a clearer view of the various parts including the mounting device;

FIGURE 3 is a plan view taken along lines 3—3 of FIGURE 2, but with the extruder rotated to its service and maintenance position; and FIGURE 4 is a transverse section of the extruder.

While the invention is susceptible of various modifications and alternative constructions, certain illustrative embodiments have been shown in the drawings and will be described below in considerable detail. It will be understood, however, that the invention is not limited to the specific forms disclosed, but on the contrary, the invention is to cover all modifications, alternative constructions and equivalents falling within the spirit and scope of the invention as expressed in the appended claims.

Referring now to the drawings, an exemplary mounting device embodying the present invention is best illustrated in FIG. 1. The device indicated by numeral 10 is a swiveling and support device comprising a combination turntable and jackscrew. The turntable portion 11 provided may be formed in one manner by casting the same as a single piece with jack members or studs 12, 13 extending from the center of the turntable 11 on either side thereof. The stud 12 is threaded and is of sufficient diameter to adequately support a substantial load as will be more clearly explained in the following description. The other jack or stud member 13 terminates, in this instance, in a hexagonal head 14 for the purposes of receiving a wrench. The turntable portion 11 is provided with anti-friction elements 15 about the circumference of said table. Numerous such antifriction elements will occur to those skilled in the art, although roller bearings 15 are illustrated for the purpose of explaining the operation of the invention. The illustrative embodiment has six such bearings, but this number of course may be varied.

Referring further to the drawings, an exemplary screw-type injection molding machine embodying the present invention is illustrated in FIGS. 2, 3 and 4 and is indicated by the numeral 20. The machine typically comprises a relatively heavy base 21 which supports an extruder assembly 30 and a die block assembly 22. The die block assembly 22 is generally rigidly mounted to the base 21 and includes a permanently mounted platen 23 facing the machine and having a conical core 24 for receiving of an extruder nozzle assembly 32. An aperture at the apex of the core 24 provides access to the dies or molds 23a which are removably mounted in the assembly 22. The extruder 30 is movable to a limited extent in a direction towards or away from the platen 23.

Thus, the injection assembly or extruder 30 is mounted for longitudinal movement along slideways 25 on sledlike member 40 having runners 42 which are disposed on the slideways 25 provided on the base 21. A table 50 is positioned atop the sled 40 and carries the assembly 30. The table 50 is positioned on and secured to the sled 40 by any convenient means, such as cap screws 26. To this end, a plurality of apertures 27 are formed in the sled 40 so that when the table 50 is properly positioned they will be aligned with threaded apertures 28 in the table about the periphery thereof. Screws 26 are provided for securing the table 50 with respect to the sled 40. In so assembling the device, the extruder 30 is aligned with the platen 23 of the die block 22 and is secured to the base 21 in all directions of movement except longitudinal along the slideways 25, which is permitted. An exemplary extruder assembly is illustrated, but by no means represents sole construction for which the present invention has utility. The extruder comprises a barrel section or cylinder 31, terminating at one end in a nozzle assembly 32, and at the other, a supporting housing 33. A gear housing 34 located behind the barrel support housing 33 may have attached any appropriate rotating device or motor 35 for the rotation of the screw 36. Hydraulic cylinders 61 are provided for the purposes of reciprocating the screw 36 within the barrel 31 for discharging through the nozzle assembly 32 plastic material which is gathered in the chamber at the head of the screw.

A brief description of the operation of the device at this time will be helpful in obtaining a greater appreciation of the invention. A hopper 51 is provided on housing 33 and into this hopper is placed raw material to be extruded. It passes from the hopper into the barrel 31 and is carried along the barrel 31 by the rotating screw 36. And in so doing is mechanically worked to a higher temperature, which makes the material pliable and places it in a condition to be forced into the die. In the present instance, the screw 36 is both reciprocable and rotatable, and during the time when a charge of material is being worked by rotation of the screw and slowly fed towards the nozzle end thereof, the screw is retracted, leaving an accumulation area between the end of the screw and the nozzle assembly. The nozzle assembly 32 is fitted to the end of the barrel by means of a collar 37 which positions an extruder head 38 at the injection end 39 of the barrel 31. The extruder head 38, which may be conveniently hinged to the end of the barrel, has a converging internal passageway which is shaped to receive the end of the screw. A nozzle tip 38a is fitted at the end of the smear chamber and is of such size that the plastic material may be forced through it and into the die by hydraulically forcing the screw 36 into the smear head toward the nozzle. This is accomplished, at least in part, by the hydraulic pistons indicated at 61 (one shown).

It is necessary in machines of this type to provide for a certain amount of longitudinal movement towards and away from the die block, thus permitting the nozzle assembly to be pressed into its injecting position during operation thereof while allowing the assembly to be retracted from that position for cleaning purposes. To this end, a cylinder 62 containing a hydraulic piston 63 is provided, with the platen 23 at one end thereof and a piston rod 64 is attached to the sled 40 in any convenient manner, such as aperture 65 passing through a portion thereof, through which a piston rod is passed and secured to the sled by nuts 66. Due to the size and weight of the extrusion machine, however, it is both impractical and inconvenient to retract the sled, and, accordingly, the extruder to a sufficient distance from the die block in order to enable one to clean and service the nozzle assembly and screw, which is removable through the front end of the barrel. To do so would require an impractically long bed or base member 21. As the extrusion or injection portion 30 of this type machine may weigh several tons, in the past it has been raised and turned by means of an overhead crane, or otherwise forcefully moved to one side by means of timbers, wedges or other means. This has necessitated uncoupling of hydraulic hoses, pipes, electrical and other fittings to avoid damage to such fittings in moving the extruder. As a result, time and effort spent on period maintenance and repair, changing screw tips, screws, as well as change-over from different types or colors of material have been burdensome, time-consuming, and expensive in machines of this general type.

In order to enhance the accessibility of the extrusion machine for cleaning and maintenance, the swiveling device 10 has been provided between the sled 40 and the table 50, upon which the extrusion machine 30 rests. A vertical hole 41 is tapped in the sled at a position which ideally corresponds to the center of gravity of the table 50 and the extrusion machine 30. Stud or jack member 12 is inserted in the tapped hole 41 and as explained is of sufficient diameter to adequately support the load of the extruder 30 which will be placed on it. The other member 13 terminates, in this instance, in a hexagonal head 14 for the purpose of receiving a wrench. The member 13 protrudes through an appropriate aperture 52 formed in the table 50 for that purpose. Adequate space is provided at this point between the sled and the table, so that the turntable 11 is out of contact with either of them. It will be clear, however, that by placing a wrench on the head 14 of the member 13 and rotating same, the entire turntable or swivel device 10 will be moved along its vertical axis, either upward or downward, depending upon the direction in which the wrench is turned. The swivel device 10 is so constructed that by removing the fasteners 28 and rotating the turntable 11 by means of the head 13 so that the turntable 11 is raised upward and against the table 50, the jack or stud section 13 is of sufficient strength and mechanical advantage to actually lift the table a minute distance from the sled 50, and when the extruder 30 is in its retracted position, the barrel end 31 thereof may be then swung in a manner indicated in FIG. 3 about the swivel device 10 and away from the die block assembly 22 where the end thereof is accessible for service and maintenance. As explained, heretofore, bearing elements 15 are provided about the circumference of the turntabl 11 to increase ease of handling the extruder 30.

Thus, when the turntable is rotated, so that it moves upward and against the table, the table rests upon the roller bearings 15 and may be easily swung about this axis to the position indicated in FIG. 3, and the entire operation may be accomplished manually even though the extruder machinery 30 is extremely heavy. The manual maneuverability is such that in most instances removal of hose, couplings, wiring or fittings is not required as the unit can be easily stopped or started in its rotation if there are any obstructions or other troubles encountered with respect to such lines. Having serviced the device, it is a simple matter to again swing the device back to its position in alignment with the die block where, by reversing the direction of rotation of the head 13 the turntable is lowered as is the table, and the extruder is again positioned to be fastened tightly to the sled for further operation thereof.

What is claimed is:

1. In an injection molding machine, the combination of means for supporting an extruding device, including a base having slideways formed on said base, a sled mounted on said base for sliding movement on said slideway, and a table on said sled secured thereto by a plurality of removable fasteners, an extruder rigidly positioned on said table, and having a longitudinally disposed barrel portion which extends into an associated platen for injecting moldable plastics into a die, a hydraulic positioning mechanism on said base and engaged with said sled for moving the same to move said extruder towards and away from the platen, a turntable disposed intermediate said sled and said table, and mounted in said sled by means of a threaded stud, said turntable including a plurality of antifriction roller bearings circumferentially disposed about it, and a stud extending upward through an aperture in said table, said turntable being rotatable on said threaded stud and into engagement with said table and adapted to lift the same from engagement with said sled when said fasteners are removed, said roller bearings supporting said table for rotation about said turntable for moving said extruder barrel into position for maintenance thereon.

2. In an injection molding machine, the combination of an injector, a base for supporting said injector, a sled disposed between said base and said injector adapted for limited movement on said base, a releasable table portion on said sled for supporting said injector, means disposed on said sled selectively operable to lift said table from said sled when the same is released, said table being supported for rotation with respect to said sled when so released, and antifriction means between said sled and said table and in bearing relation with said table, whereby said table is rotatable on said antifriction means for servicing of said injector.

3. In an injection molding machine, the combination of an injector, a base for supporting said injector, a sled disposed between said base and said injector adapted for limited movement on said base, a releasable table portion on said sled for supporting said injector, means defining a turntable rotatably disposed on its axis on said sled beneath said table, means for raising and lowering said turntable, said turntable adapted to support said table when raised, and antifriction bearings on said turntable in bearing relation with said table, whereby said table is rotatable on said bearings for servicing said injector.

4. In an injection molding machine, the combination of an injector, a base for supporting said injector, a sled disposed between said base and said injector adapted for limited movement on said base, a releasable table on said sled for supporting said injector, means defining a turntable intermediate said sled and said table, antifriction bearings circumferentially disposed on said turntable, said turntable being formed with axially extending studs, at least one of said studs having threads thereon and being screwed into said sled, means on said turntable for rotating the same in a direction to raise the turntable into supporting engagement with said table whereby said table rests on said bearings, said table being rotatable on said bearings for servicing of said injector.

5. In an injection molding machine, the combination of an injector, a base for supporting said injector, a sled disposed between said base and said injector, adapted for limited movement on said base, a releasable table portion on said sled for supporting said injector, means defining a turntable intermediate said sled and said table, antifriction bearings disposed on said turntable, said turntable being formed with axially extending studs, at least one of said studs having treads thereon and being screwed into said sled, means on said turntable for rotating the same in a direction to raise the turntable into supporting engagement with said table at substantially the center of gravity thereof, whereby said table rests on said bearings, said table being rotatable on said bearings for servicing said injector.

6. In an injection molding machine, the combination of means for supporting an extruding device, including a base having slideways formed on said base, a sled mounted on said base for sliding movement on said slideway, and a table on said sled secured thereto by a plurality of fasteners, an extruder rigidly positioned on said table, a turntable disposed intermediate said sled and table, and mounted in said sled by means of a threaded stud, said turntable including a plurality of antifriction roller bearings circumferentially disposed about it, and a stud extending upward through an aperture in said table, said turntable being rotatable about said threaded stud into engagement with said table and adapted to lift the same from engagement with said sled when said fasteners are removed, said roller bearings supporting said table for rotation about said turntable for moving said extruder into position for maintenance thereon.

7. In an injection molding machine, the combination of means for supporting an extruding device, including a base having slideways formed on said base, a sled mounted on said base for sliding movement on said slideway, and a table on said sled secured thereto by a plurality of removable fasteners, an extruder rigidly positioned on said table, and having a longitudinally disposed barrel portion which extends into an associated platen for injecting moldable plastics into a die, a hydraulic positioning motor on said base and engaged with said sled for moving the same to move said extruder towards and away from the platen, a turntable disposed intermediate said sled and table, and mounted in said sled by means of a threaded stud, said turntable including a plurality of antifriction roller bearings circumferentially disposed about it, and a stud extending upward through an aperture in said table, said turntable and said stud being rotatable for moving the same up and down in said sled on said threaded stud and into engagement with said table and adapted to lift said table from engagement with said sled when said fasteners are removed, said table being wholly supported on said turntable by said threaded stud, said roller bearings supporting said table for rotation about said turntable for moving said extruder barrel into position for maintenance thereon.

References Cited in the file of this patent

UNITED STATES PATENTS

| 1,466,509 | Laskey | Aug. 28, 1923 |
| 2,649,621 | Moslo | Aug. 25, 1953 |
| 3,014,243 | Hehl | Dec. 26, 1961 |